United States Patent [19]

Berninger et al.

[11] Patent Number: 4,726,217
[45] Date of Patent: Feb. 23, 1988

[54] PROCESS FOR THE PRODUCTION OF A TUBE SPRING MANOMETER MEASUREMENT SYSTEM

[75] Inventors: Helmut Berninger, Obernburg; Hans Klein, Erlenbach; Werner Müller, Elsenfeld; Thomas Neugebauer, Mainberg-Schonungen; Kurt Neubeck, Miltenberg, all of Fed. Rep. of Germany

[73] Assignee: Alexander Wiegand GmbH+Co., Armaturen-und Manometerfabrik, Klingenberg/Main, Fed. Rep. of Germany

[21] Appl. No.: 899,098

[22] Filed: Aug. 22, 1986

[30] Foreign Application Priority Data

Aug. 22, 1985 [DE] Fed. Rep. of Germany ....... 3530056

[51] Int. Cl.⁴ .................. G01L 27/00; B23Q 17/00
[52] U.S. Cl. .................................. 73/4 R; 29/407
[58] Field of Search ............... 73/4 R, 4 V; 29/407; 219/10.57, 221, 227

[56] References Cited

U.S. PATENT DOCUMENTS

| 3,868,843 | 3/1975 | Moseman, Jr. ........... 73/4 R |
| 4,148,123 | 4/1979 | Neubeck et al. .......... 29/407 |

FOREIGN PATENT DOCUMENTS

| 408336 | 1/1968 | Australia ............... 73/4 R |
| 2654279 | 2/1978 | Fed. Rep. of Germany . |
| 3143061A1 | 5/1983 | Fed. Rep. of Germany . |
| 3231257A1 | 2/1984 | Fed. Rep. of Germany . |

Primary Examiner—Stewart J. Levy
Assistant Examiner—Robert R. Raevis
Attorney, Agent, or Firm—Saidman, Sterne, Kessler & Goldstein

[57] ABSTRACT

A method of making a tube spring manometer measurement system is disclosed. The system, comprising a tube spring, display assembly and at least one operating member which actuates said display assembly, e.g. a tie rod, is mounted and assembled to form a functional assembly. A predetermined reference pressure is then applied to the tube spring. The deflection of the display assembly caused by said reference pressure is compared to a theoretical deflection. If the difference between a theoretical deflection associated with said reference pressure and the observed actual deflection is excessive, local heat is supplied by means of a laser beam to at least one operating member and/or said tube spring, thereby removing material and/or altering the internal tension thereof. These changes are utilized to influence the range and/or zero baseline of the instrument. Heat is supplied without force or contact, so that the effect of the heat can be monitored directly and discontinued at exactly the moment the desired display accuracy is attained.

10 Claims, 5 Drawing Figures

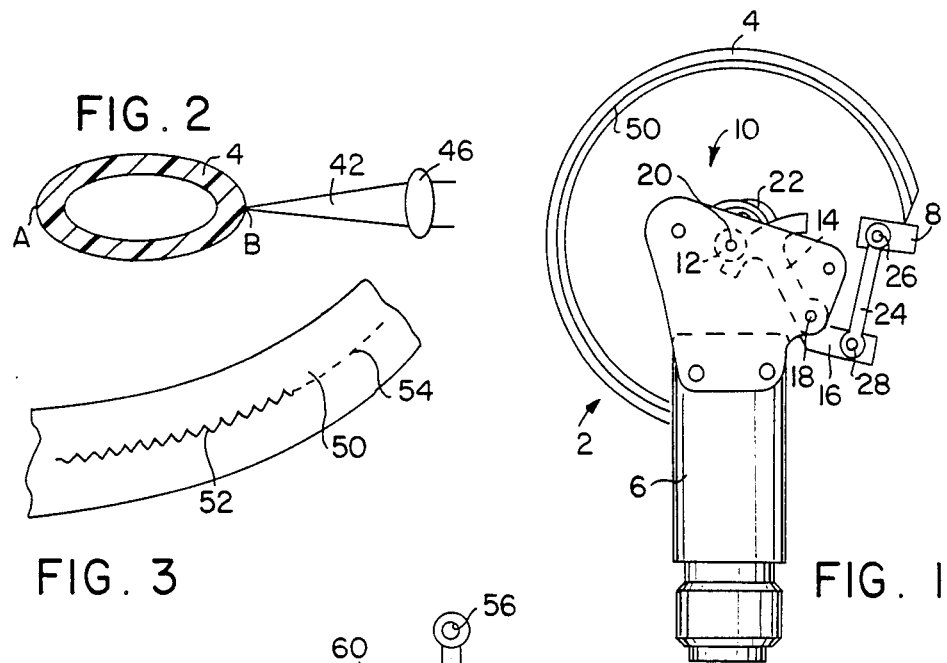
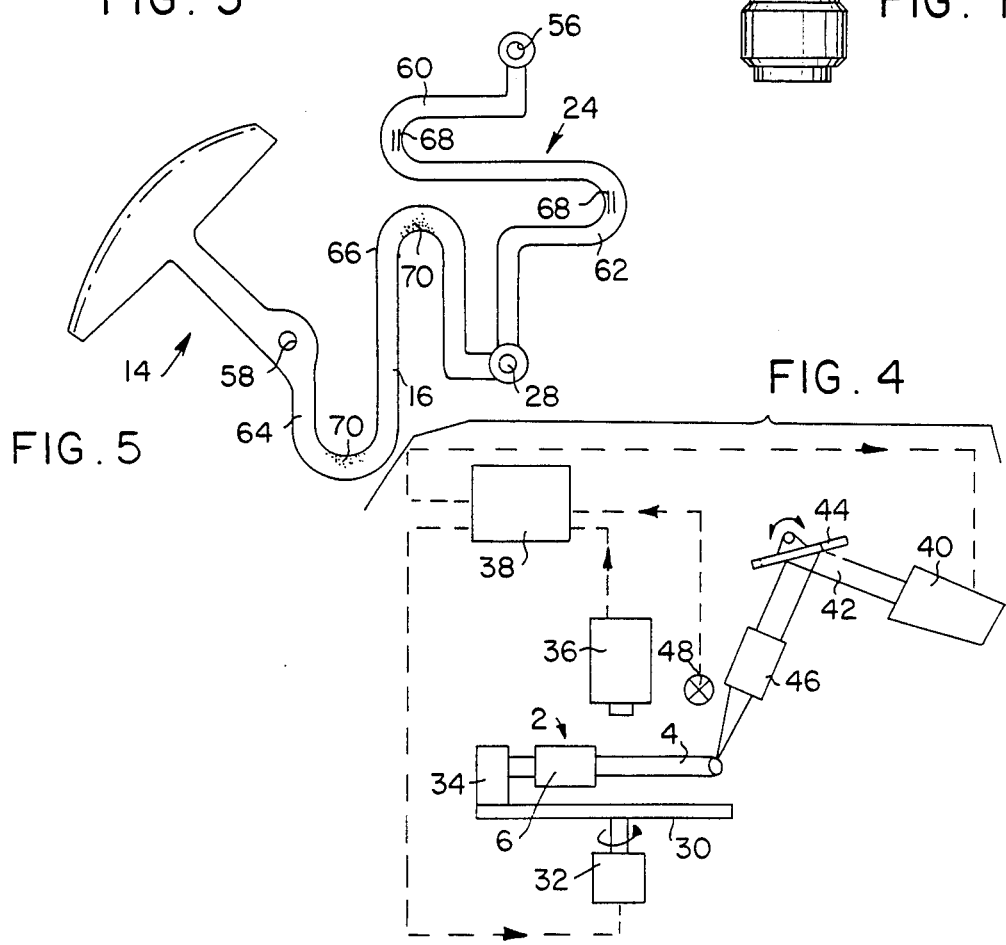

PROCESS FOR THE PRODUCTION OF A TUBE SPRING MANOMETER MEASUREMENT SYSTEM

BACKGROUND OF THE INVENTION

This invention relates to a process for producing a tube spring manometer measurement system.

THE PRIOR ART

A tube spring manometer measurement system typically comprises a tube spring which is rigidly connected to a spring support at one end. A tie rod is pivotally mounted at the free end of said tube spring. The other end of the tie-rod articulates with a quadrant lever of a display assembly, which typically comprises a rotatable pointer shaft. The pointer shaft bears a pointer adapted to be moved over a dial or dial face. The display assembly forms an integral part of the device in this case. If the free end of said tube spring is deflected owing to internal pressure, its movement is conveyed to the quadrant lever by means of the tie rod and is then converted into a particular pointer position by the display assembly.

An alternative to such tube spring manometer measurement systems of the type mentioned hereinabove are measurement systems in which the display assembly is attached to the free end of the tube spring, thus participating in the spring deflection in its entirety, and in which the operating member is an actuating rod which is pivotally mounted on the quadrant lever on the one hand and is firmly secured to the device itself, on the other hand. This present invention, however, will be explained in the following with reference to the more common measurement systems mentioned as the first type above.

When pressure within its operating range is applied to a manometer, it should display the applied pressure within permissible tolerances. Range is understood to mean a range of pressures corresponding to deflection of the pointer from its zero baseline to a limit corresponding to the nominal pressure or maximum limit of the dial scale. Moreover, the display should be linear within permissible tolerances, i.e. fractional increases in nominal pressure should be reflected by fractional increments in pointer movement. Owing to the manufacturing tolerances of the elements of the measurement system, differences occur from system to system with respect to the material properties, dimensions, and in the display, all of which have an effect on the range of the system. If permissible display tolerances are to be observed, however, each and every measurement system must be adjusted and calibrated.

In accordance with a commercial process for producing a tube spring manometer measurement system, adjustment is effected as follows. An operator observes the deflection of the display assembly while a reference pressure is being applied to the tube spring. He then manually changes the operating members, e.g. the tie rod and/or elements of the display, or changes the sites of articulation of the operating elements and/or changes other elements in the display assembly, until the display corresponds to the reference pressure. If necessary, this operation is repeated several times. It is rather obvious that this known approach is costly and time-consuming.

It is also known (from German DE-OS No. 2,654,279) to measure the deflection of the tube spring under reference pressure prior to manufacturing the bearings for the operating members, e.g. the tie rod, and to then determine at least one of the geometric locations for the bearings based on the measured deflection on empirical or calculated relationships. This process facilitates the manufacture and production of tube spring manometer measurement systems with high display accuracy, without requiring manual adjustment and calibration. This known process, however, does not take into consideration those factors caused by manufacturing differences in the display units which thus affect the accuracy of the display. If the accuracy requirements placed on the tube spring manometer measurement system also demand the elimination or reduction of the deviations caused by display unit, additional manual adjustment and calibration will be necessary even in this process.

Finally, a process is also known for manufacturing and producing a tube spring manometer measurement system in which the functionally mounted measurement system is exposed to an etching process while subjected to a reference pressure (German DE-OS No. 3,231,257). The measurement system is removed from the etching bath when the deflection of the display assembly has reached a nominal value. This approach, however, has substantial practical drawbacks. For instance, it is virtually impossible to accurately time the completion of the etching process. Moreover, it is inherent to this approach that all elements of the measurement system are subjected to the etching medium up to a certain etching bath level, but not above the same, so that it is virtually impossible to confine this operation to a selected location on the respective measurement system.

OBJECT OF THE INVENTION

It is therefore the object of the present invention to provide a method of producing a tube spring manometer measurement system such that adjustment and calibration can be effected with the least amount of manual work while still satisfying high accuracy requirements.

SUMMARY OF THE INVENTION

In accordance with the invention, heat from a laser acts on at least one of the elements of the measurement system whose material composition and/or geometry influences the display and whose material composition and/or geometry can be changed even after the functional measurement system has been mounted and assembled, without impairing the proper functioning of said measurement system. These elements include the tube spring and the operating members.

The effects achieved by the application of heat from the laser vary from the elimination of internal tension by heating the material to above its recrystallization temperature, to local melting accompanied by changes in the shape, structure and tension state of the material, to material removal by sublimation, in which the material is converted directly from the solid to gaseous state. The application of heat to the tube spring can thus alter the spring constant, thus changing the spring deflection associated with a predetermined pressure. This permits an range adjustment. Furthermore, the application of heat to the tube spring can effect a zero baseline adjustment by changing the state of a pretensioned tube spring, that is, causing the tube spring to assume a different configuration even at zero applied pressure. The geometry of the operating members, e.g. the tie rod and the quadrant lever is altered by the laser in preference to their behavior under load, since the deflection of the free end of said tube spring is transmitted to the pointer virtually without force. Hence, when the tube spring is subjected to a predetermined pressure, the load on the operating members does not vary. Heat on the operating members thus alters the geometry thereof, e.g. the distance between the two bearings of the tie rod. This can be effected, for example, by eliminating previously provided internal tension by supplying heat, thereby causing the operating member to assume a new configuration corresponding to the new tension state. This change of shape of the operating members, e.g. the tie rod and the quadrant lever, can be utilized in a manner known per se to adjust and calibrate the range and zero baseline.

The reference pressure is preferably the nominal atmospheric pressure. However, it may also be a fraction of the nominal pressure or a pressure greater than the nominal pressure. Moreover, it may also be the pressure associated with the zero baseline. The theoretical deflection correlated with the reference pressure can be that deflection at which the reference pressure is accurately displayed. It may also be a deflection, however, which deviates from the latter in a defined way merely for adjustment purposes. For example, it may be desired to displace the zero baseline to adjust the range, e.g. by applying heat to the tube spring, to then compensate for this displacement of the zero baseline by applying heat to the tie rod. Because this zero baseline adjustment in turn affects the position of the pointer at the nominal pressure, the range must be similarly adjusted so that the deflection deviates from the exact display of the reference pressure used to adjust the range by exactly the same amount as the zero baseline displacement caused by this adjustment of the range.

Applying heat to the tube spring commonly results in an increase in the range. Hence, adjusting the range by applying heat to the tube spring presumes that the range is initially too low. Changing the geometry of the operating members by supplying heat and the resultant reduction in tension can both lengthen or shorten the effective length of the operating member, depending on whether the altered tension is a compressive or extensive force. This makes it possible to increase or decrease the range, for example, by changing the effective length of the quadrant lever. Hence, zero baseline adjustment can also be effected both from above and from below the zero baseline.

The process of the invention can be applied both to tube spring manometer measurement systems, which have already been adjusted prior to further adjustment by the application of heat, and to tube spring manometer measurement systems, which have not been adjusted prior to the application of heat. Preliminary adjustment can, for example, involve adjustment according to the methods set forth in German DE-OS No. 2,654,279, mentioned above.

Monitoring the actual deflection at the moment the theoretical deflection associated with the reference pressure is substantially attained may be effected in different ways. Monitoring can be performed visually or by means of optoelectronic devices or also by closing an electromechanical contact when the theoretical deflection is reached.

Finally, the process of the invention can involve repetitive application of heat to one or more different elements in the measurement system, to achieve the desired accuracy of display.

A noteworthy feature of the process of the invention includes the fact that the adjustment of the tube spring manometer measurement system occurs without physical contact or application of force to its elements, simply by application of heat by a laser beam. Therefore while heat is being applied to the measurement system, no extraneous forces act thereon. Accordingly the effect of application of heat on the deflection can be observed directly. This makes it possible to continue the application of heat until the theoretical deflection has been achieved. This is a significant simplification over, an approach in which the measurement system is first adjusted, the effects of this measure are then observed, renewed adjustment and renewed observation following in alternating sequence. In accordance with the invention, a high accuracy of display can be achieved within a relatively short adjustment period. Finally, it is obvious that specific amounts of deviation in the display unit can be taken into consideration when adjustment is effected in accordance with the invention.

In the drawings:

FIG. 1 shows a schematic elevational view of a tube spring manometer measurement system;

FIG. 2 shows an enlarged cross section through the tube spring of the measurement system in accordance with FIG. 1;

FIG. 3 shows an enlarged, sectional lateral view of the tube spring of the measurement system in accordance with FIG. 1;

FIG. 4 shows a schematic depiction of a device for executing the of the invention process; and FIG. 5 shows an enlarged lateral view of a tension rod and a toothed segment of a modified embodiment of a tube spring manometer.

DETAILED DESCRIPTION

An example of a tube spring manometer measurement system 2 will now be explained with reference to FIGS. 1 to 3, to which the process in accordance with the invention can be applied. The tube spring manometer measurement system 2 employs as a measuring element a hollow tube spring 4 formed of a tube of oval cross section (see FIG. 2), which is affixed to a spring support 6 at one, e.g. by clamping or soldering end. A hole extending through the spring support 6 and communicates to the interior of the hollow tube spring 4 tube spring 4 is closed at its other free end, and carries an end piece 8. Spring support 6 carries a display assembly 10, comprising a pointer unit comprising a pointer shaft pinion 12 and a toothed quadrant 14 associated with a quadrant lever 16. The toothed quadrant 14 is mounted to pivot about a quadrant axle 18 and meshes with the pointer shaft pinion 12. The pointer shaft pinion 12 is mounted on a pivoted pointer shaft 20 to which a pointer (not shown) can be attached. A return spring 22 engages pointer shaft 20. A tie rod 24 is pivotally connected at an upper bearing 26 to end piece 8 with, and at a lower bearing 28 quadrant lever 16. The tube spring manometer measurement system 2 can be assembled with a housing (not shown), a dial (not shown) and a pointer to form a complete tube spring manometer.

In operation, when the tube spring 4 is subjected to increasing internal pressure, for example, due to a variation in ambient air pressure its flat, oval cross section (refer to FIG. 2) widens, thereby increasing the overall curvature of the tube spring. This in turn results in a deflection of the free end of said tube spring carrying end piece 8. This moves the quadrant lever 16 moving the quadrant 14 with respect to the pinion 2, rotating pointer shaft 20.

During the manufacture of a tube spring manometer measurement system, the elements thereof are assembled as depicted in FIG. 1. In so doing, at least one of the bearings 26 and 28 can be manufactured in accordance with the process known from German DE-OS No. 2,654,279, i.e. so as to take the deflection of the free end of said tube spring 4 at a specified reference pressure into consideration. The tube spring manometer measurement system will already be precalibrated if these steps are followed.

Once the tube spring manometer measurement system, which can be precalibrated as described above, has been provided with elements which permit observation of the display—such elements might be the dial and pointer—, the tube spring manometer measurement system is installed in a further production step in a device schematically illustrated in FIG. 4. This device comprises a turntable 30 with a rotary drive system 32. Turntable 30 supports a mount 34 to which the spring support 6 is clamped. Mount 34 is designed such that it makes it possible to apply reference pressures to the interior of tube spring 4. Mount 34 carries the tube spring manometer measurement system with respect to turntable 30 such that the center of curvature of said tube spring 4 coincides approximately with the axis of rotation of drive system 32. An opto-electronic monitoring device 36 is mounted above said turntable 30 and supplies a signal to a control unit 38 which is a measure of the deflection of the display assembly, e.g. that is, measures the deviation of the position of the pointer from a predetermined theoretical position.

The device illustrated in FIG. 4 also comprises a laser 40 that emits a beam 42, which is deflected by a pivotal mirror 44 so as to be directed in a particular direction. A lens 46 is located in the beam path of said laser beam 42 and focuses the same. A light-sensitive sensor 48 is directed approximately at the focal point of said laser beam 42 and supplies a brightness signal to said control unit 38. This brightness signal indicates whether the focused laser beam 42 is properly aimed on the respective object or not. The control unit 38 controls the rotary drive system 32, the drive system for the mirror 44 (not shown), the laser source 40 and the intensity and duration of laser beam 42, as well as the application of the reference pressure to the tube spring 4.

The system comprising the laser source 40, mirror 44 and lens 46 is mounted and adjusted such that the laser beam falls on the tube spring 4 substantially with the focal point of said laser beam, and so that this point of impingement is located on what is termed the high edge 50 of the tube spring 4 as shown in FIG. 2. The high edge 50 of said tube spring 4 essentially includes a line along the tube spring including one of the apices A or B, that is, including the outermost points along the major axis on the major axis of the oval cross section of said tube spring 4.

After the mounted (and optionally precalibrated) tube spring manometer measurement system 2 has been installed in the device illustrated in FIG. 4, a reference pressure is applied to the interior of tube 4. This can be a nominal pressure, for example. The resultant display of the measurement system is monitored by the opto-electronic monitoring device 36, and the control device 38 determines the difference between the actual deflection and the theoretical deflection of the pointer, that is, the deflection corresponding to the reference pressure.

If this difference is outside the accuracy requirements of the measurement system, the laser beam 42 is directed onto the high edge 50 of the tube spring under the control of control device 38. The point of impingement of the beam on the tube spring 4 moves along its high edge 50 due to the rotation of said turntable 30. This causes heat to act on the tube spring 4 along a line which, for example, can be an uninterrupted undulating line 52 or a dotted line 54 as shown in FIG. 3.

The line along which material is removed is begun preferably at the end of tube spring 4, which is clamped to support 6, since weakness of the tube spring at this point (that is, caused by impingement of the laser beam 42 on the tube spring) has the relatively maximum effect on the shape of the tube spring 4. By appropriately controlling the mirror 44 in response to the signals emanating from sensor 48, the control device 38 and ensures that the laser beam 42 continues to impinge on the high edge 50 of tube spring 4, and effectively regulates the shape of the undulating line 52.

The tube spring 4 is irradiated by laser beam 42 until the difference between the actual and theoretical deflection falls to within the desired accuracy range of said display.

Heat is supplied to the tube spring by the laser beam with the intention of removing material from the tube spring 4. When the energy density is sufficiently high, sublimation occurs with the material being converted directly from the solid to the gaseous state. In this case, the unremoved material is influenced relatively little by the addition of heat, such that removal of material by the process of sublimation is desirable. It is also possible, however, to evaporate the material from the liquid phase, this requiring less supplied heat than for removal by sublimation. In the event that material is evaporated from the melted state, one portion of this melted phase will solidify again and may possibly have a different material composition and different tensile and structural characteristics than the adjacent material comprising the tube spring. In cases where this can be tolerated, removal of material from the liquid phase is permissible.

When the material of the tube spring 4 is removed by supply of heat, the behavior of the tube spring 4 under load is influenced and thus its internal tension as well. If, for example, the tube spring 4 has a certain state of pre-tension as a result of cold-working prior to the application of heat, this can change as a result of heat application, thus resulting in a displacement of the zero baseline. Moreover, in the case of tube springs with internal pre-tension, local removal of tension by heating alone—that is, without actual removal of material—can influence both the tension and the zero baseline.

Although heat is provided in the above-mentioned example preferably along the high edge 50 near the spring support 6, heat may also be supplied in other areas of the tube spring 4, for instance in portions away from the high edge, which as noted, is along the major axis of the cross section of the tube spring. The heat does not provide as pronounced an effect when heat is supplied away from the region of the high edge. There are applications, however, where this more attenuated effect can be utilized for slower and thus finer adjustment.

FIG. 2 illustrates how the laser beam 42 is directed onto the high edge 50. It impinges substantially along the major axis of the flat, oval cross-sectional profile of the tube spring 4. Other angles of laser beam impingement relative to the tube spring surface are also possible, however. The laser beam 42, for instance, could extend tangentially through the apex B.

FIG. 5 shows on an enlarged scale the toothed quadrant 14 and the tie rod 24 of a modified tube spring manometer measurement system. In this embodiment, the tie rod 24 has a hole 56 at the location of the bearing 26 (FIG. 1), by which it is pivotally attached to end piece 8. The toothed quadrant 14 is provide with a hole 58 for the quadrant axle 18. By changing the spacing between the hole 58 and bearing 28, the tension of said measurement system can be influenced substantially. In particular, enlarging the spacing, i.e. lengthening the effective length of the quadrant lever 16, reduces the tension. Changing the distance between said hole 56 and said bearing 28, i.e. altering the effective length of said tie rod 24, can affect the position of the zero baseline i.e., the rest position of the tube spring 4. The special feature of said tie rod 24 in accordance with FIG. 5 is that it exhibits two U-shaped segments 60 and 62, the shanks of these segments extending substantially perpendicular to a straight line connecting hole 56 with bearing 28. In the illustrated embodiment, the two U-shaped segments 60 and 62 are mounted in opposite directions. A similar embodiment with a first U-shaped segment 64 and a second U-shaped segment 66 is also evidenced by quadrant lever 16.

During the manufacture of a tube spring manometer measurement system comprising a toothed quadrant 14 and tie rod 24 in accordance with FIG. 5, the bases of each of the U-shaped segments 60, 62, 64 and 66 are cold-formed so that the respective bases are pre-tensioned. This is done such that the U-shaped segments 60 and 62 of said tie rod 24 are subject to mutually opposite internal forces. The base of U-shaped segment 60 is subjected to tension on its inside. (on the right in FIG. 5), whereas the base of U-shaped segment 62 is subjected to pressure on the inside (on the left in FIG. 5). The two U-shaped segments 64 and 66 are provided with mutually opposite internal forces in a similar manner.

In this embodiment of the invention, it is possible to selectively change the effective length of said tie rod 24 or of said quadrant lever 16 by the application of heat to the respective pre-tensioned base. If, for example, the effective length of said tie bar 24 is to be extended, heat is supplied to the region of the base of segment 60 which is subject to tension, the result being that the U-shaped segment 60 expands somewhat. A shortening of said tie rod 24 can be achieved, on the other hand, by supplying heat to the region of the base of said U-shaped segment 62 which is subjected to pressure, thus causing the shanks thereof to move together somewhat. In so doing, the heat is preferably supplied along short straight lines 68 as indicated on segments 60 and 62, or in the form of a dotted pattern 70, as indicated on segments 64 and 66. It goes without saying that the length of said quadrant lever 16 can be similarly changed.

The changes in the tie rod 24 and quadrant lever 16 as explained above with reference to FIG. 5 are not undertaken to alter the behavior of these elements under load, but rather to alter their effective length. The purpose of supplying heat by means of a laser beam in this case is not to remove material, but rather to diminish internal tension, thereby altering the internal state of tension and finally the geometry of the respective element. The heat acts on said tie rod 24 and quadrant lever 16 without contact and without application of appreciable force so that, the display or deflection of the tube spring manometer measurement system can be monitored continuously as heat is being supplied. The heat supplied by means of the laser beam can be discontinued whenever the desired theoretical deflection has been achieved.

In practice of the invention, therefore, tube spring manometer measurement system comprising a tube spring, display assembly and at least one operating member which actuates said display assembly, e.g. a tie rod, is assembled. This is then subjected to a reference pressure while monitoring the deflection of the display assembly responsive to the said reference pressure. If the difference between a theoretical deflection associated with the reference pressure and the observed actual deflection is excessive, local heat is supplied by means of a laser beam to at least one operating member and/or to the tube spring, thereby removing material and/or altering the internal tension. These changes are utilized to influence the range and/or the zero baseline. In both embodiments of the invention, heat is supplied without either force or contact, so that the effects of supplying heat can be monitored directly and discontinued at exactly the moment the desired display accuracy is attained.

While a preferred embodiment of the invention has been described, various modifications and improvements can be made thereto without departure from its spirit and scope, which is therefore not to be measured by the above exemplary disclosure, but only by the following claims.

What is claimed is:

1. A process for producing a tube spring manometer measurement system comprising a tube spring which serves as a measuring element, a display assembly and at least one operating member which deflects said display assembly responsive to pressure applied to said tube spring, the free end of said tube spring, said display assembly and said operating member being connected together to form a functional measurement system, said process comprising the steps of subjecting the tube spring to a predetermined referecne pressure, comparing the deflection of said display assembly to a theoretical deflection corresponding to said reference pressure, and applying heat locally in metered quantities by means of a laser beam to at least one of said operating member and said tube spring until the deflection of said display assembly substantially approaches the theoretical deflection associated with said reference pressure.

2. The process as set forth in claim 1, characterized in that heat is applied to said tube spring.

3. The process as set forth in claim 2, characterized in that said tube spring is of oval cross section having high edges along the major axis of the oval, and comprising the additional step of moving the point of impingement of said laser beam along one of the high edges of said tube spring.

4. The process as set forth in claim 3, characterized in that the local application of heat is applied in the form of a dotted line.

5. The process as set forth in claim 3, characterized in that the local application of heat is applied in the form of an uninterrupted line.

6. The process as set forth in claim 5, characterized in that said line is an undulating or zig-zag line.

7. The process as set forth in claim 2, characterized in that heat is applied to the end of said tube spring opposite the free end therof.

8. The process as set forth in any one of claims 2 to 7, characterized in that the application of heat substantially causes material of said tube spring to be removed.

9. The process as set forth in claim 1, characterized in that heat is applied at a site on said operating member such that the effective length of said operating member is changed.

10. The process as set forth in claim 9, characterized in that said operating member is pretensioned prior to the application of heat thereto, and said tension is then reduced in accurately apportioned amounts by application of heat.

* * * * *